US012651043B1

(12) United States Patent
Kendapadi et al.

(10) Patent No.: US 12,651,043 B1
(45) Date of Patent: Jun. 9, 2026

(54) SYSTEMS AND METHODS FOR VERIFYING ACCURACY OF A MODEL BUILT USING SYNTHETIC DATA

(71) Applicant: Wells Fargo Bank, N.A., San Francisco, CA (US)

(72) Inventors: Ananth Kendapadi, Charlotte, NC (US); Rameshchandra Bhaskar Ketharaju, Telangana (IN); Vinothkumar Venkataraman, Bangalore (IN); Ashutosh Verma, Bengaluru (IN); Naveen Gururaja Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 1001 days.

(21) Appl. No.: 17/812,370

(22) Filed: Jul. 13, 2022

(51) Int. Cl.
| | |
|---|---|
| *G06K 9/62* | (2022.01) |
| *G06F 18/21* | (2023.01) |
| *G06F 18/211* | (2023.01) |
| *G06F 18/22* | (2023.01) |
| *G06N 20/00* | (2019.01) |

(52) U.S. Cl.
CPC .......... *G06F 18/217* (2023.01); *G06F 18/211* (2023.01); *G06F 18/22* (2023.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,710,365 | B2 * | 7/2017 | Correll | ............... G06F 11/3684 |
| 10,783,068 | B2 | 9/2020 | Srivastava et al. | |
| 10,990,901 | B2 | 4/2021 | Deo et al. | |
| 10,997,495 | B2 | 5/2021 | Walters et al. | |
| 11,176,481 | B2 | 11/2021 | Grehant | |
| 11,631,032 | B2 * | 4/2023 | Goodsitt | .............. G06N 3/0475 |
| | | | | 706/12 |
| 11,741,058 | B2 * | 8/2023 | Walters | .................. G06N 5/025 |
| | | | | 707/804 |
| 11,810,000 | B2 * | 11/2023 | Walters | .................. G06N 3/088 |
| 11,977,550 | B1 * | 5/2024 | Aptekar | ................. G16H 10/60 |
| 2015/0309919 | A1 * | 10/2015 | Correll | ............... G06F 11/3684 |
| | | | | 714/38.1 |
| 2021/0019804 | A1 | 1/2021 | Truong et al. | |
| 2021/0397972 | A1 * | 12/2021 | Walters | ............... G06N 3/0985 |
| 2023/0138763 | A1 * | 5/2023 | Walters | ................. G06F 18/214 |
| | | | | 382/159 |

* cited by examiner

*Primary Examiner* — Maikhanh Nguyen
(74) *Attorney, Agent, or Firm* — K&L Gates LLP

(57) ABSTRACT

Systems, apparatuses, methods, and computer program products are disclosed for verifying accuracy of models trained using synthetic data. An example method includes selecting, by data analysis circuitry, an authentic data point set from an authentic dataset. The example method also includes generating, by modeling circuitry and using the authentic data point set, output data of a model having been trained using a synthetic dataset. The example method also includes determining, by model scoring circuitry, an accuracy score for the model based on the output data.

15 Claims, 5 Drawing Sheets

SYSTEMS AND METHODS FOR VERIFYING ACCURACY OF A MODEL BUILT USING SYNTHETIC DATA

BACKGROUND

Synthetic data is valuable as a source of data for training models (e.g., machine learning models and the like). However, because synthetic data is not obtained by direct measurement, predictions and/or other output of a model trained using synthetic data may not be suitably accurate.

BRIEF SUMMARY

Predictive modeling is a commonly used statistical technique to predict future events or behavior. Predictive modeling typically involves analyzing historical and current data and generating and deploying a model trained on that data to help predict future outcomes. However, in certain applications, data that is needed to train a model may not be directly accessible. For instance, the data may be sensitive data pertaining to individuals who do not desire their data be shared or used for various purposes. Such data may be regulated through laws restricting access and/or use of the data. Additionally, in some cases, specific conditions of data needed for the model may not be obtainable by way of authentic data (e.g., data generated by real-world events) due to those specific conditions having not yet occurred. Further, models may be trained using an immense amount of data, and collecting a necessary amount of labeled, authentic training data can be cost prohibitive.

To overcome these issues, synthetic data may be used in place of authentic data. Unlike authentic data, synthetic data is not obtained by direct measurement. In other words, synthetic data is artificially manufactured rather than generated by real-world events. Synthetic data may be generated algorithmically and is often used as a stand-in for datasets of production and/or operational data. Synthetic data helps reduce constraints when using sensitive or regulated data, and can also be used to tailor data to certain conditions that cannot be obtained from authentic data.

However, the use of synthetic data presents several drawbacks. For instance, building a model using synthetic data and subsequently testing the model with synthetic data may lead to inaccurate results. For example, the synthetic data used to evaluate the model may not have the same characteristics as authentic data in that the synthetic data is not an accurate representation of real-world data. Further, in the event that an evaluation of the model indicates inconsistent results, it is difficult to discern whether the synthetic training data, the synthetic test data, or the model itself is the significant contributor to the inconsistent results.

Systems, apparatuses, methods, and computer program products are disclosed herein for verifying accuracy of a model built using synthetic data. Example embodiments leverage samples of authentic data points to verify accuracy of a model trained on synthetic data by comparing predicted outputs of output data of the model with known outcomes of the authentic data points. By doing so, example embodiments avoid the issues in traditional implementations of synthetic data-based model testing.

In one example embodiment, a method is provided for verifying accuracy of models trained using synthetic data. The method includes selecting, by data analysis circuitry, an authentic data point set from an authentic dataset. The method also includes generating, by modeling circuitry and using the authentic data point set, output data of a model having been trained using a synthetic dataset. The method also includes determining, by model scoring circuitry, an accuracy score for the model based on the output data.

In another example embodiment, an apparatus is provided for verifying accuracy of models trained using synthetic data. The apparatus includes data analysis circuitry configured to select an authentic data point set from an authentic dataset. The apparatus also includes modeling circuitry configured to generate, using the authentic data point set, output data of a model having been trained using a synthetic dataset. The apparatus also includes model scoring circuitry configured to determine an accuracy score for the model based on the output data.

In another example embodiment, a computer program product is provided for verifying accuracy of models trained using synthetic data. The computer program product includes at least one non-transitory computer-readable storage medium storing software instructions that, when executed, cause an apparatus to select an authentic data point set from an authentic dataset. The software instructions, when executed, also cause the apparatus to generate, using the authentic data point set, output data of a model having been trained using a synthetic dataset. The software instructions, when executed, also cause the apparatus to determine an accuracy score for the model based on the output data.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
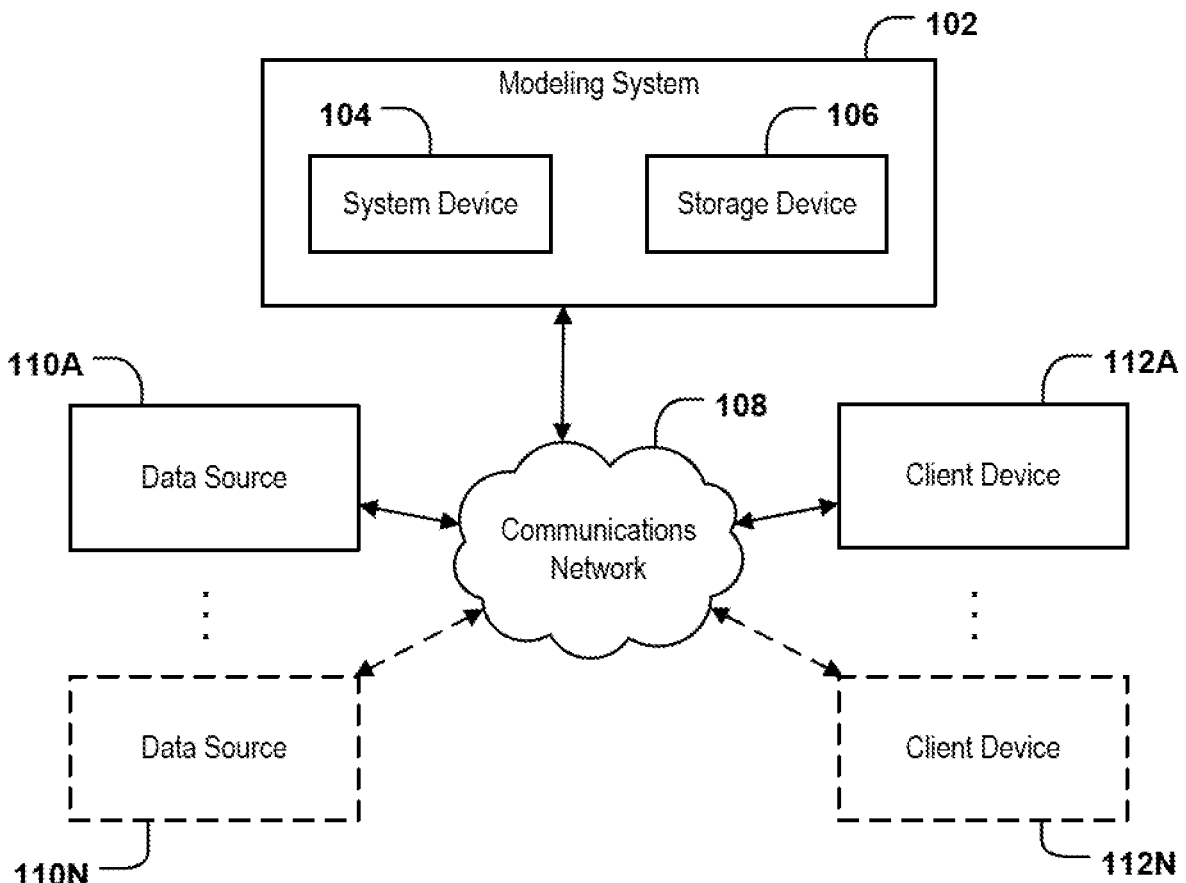
FIG. 1 illustrates a system in which some example embodiments may be used for verifying accuracy of a model.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for verifying accuracy of a model, and in particular, verifying accuracy of a model built using synthetic data (e.g., a model having been trained exclusively on synthetic data).

Traditionally, models trained exclusively with synthetic data may produce predictions that do not reflect real-world outcomes. In this regard, when synthetic data is used as test data to evaluate (e.g., verify accuracy of) the trained model, the results may appear to be accurate, while actually being inaccurate (e.g., due to the synthetic data not appropriately reflecting real-world data). Thus, it may be difficult to identify issues with the trained model until the model is actually put into production and begins exhibiting problems when processing real data. Further, using a fully synthetic approach to training and testing a model may make it difficult to discern whether problems exhibited by output data of the model are the result of the synthetic training data, the synthetic testing data, and/or the model itself.

Embodiments herein leverage authentic data to effectively verify accuracy of a model trained using synthetic data (which may at times be referred-to hereinafter as a "synthetically-trained model"). Advantageously, some embodiments may leverage authentic data points that have been explicitly granted permission for use in model accuracy verification. In this regard, issues surrounding data privacy are avoided while the benefits of using actual, authentic data to ensure model accuracy are realized. In some embodiments, an example synthetically-trained model may be transmitted to a secure environment in order to provide additional protection of authentic data used in verifying accuracy of the model. Additionally, in some embodiments, a variance score may be generated based on a comparison of output data generated from both a synthetically-trained model and a second model trained on authentic data. The variance score may then be used to as an additional confirmation of a model's accuracy and in some embodiments may trigger retraining of the model.

Accordingly, the present disclosure sets forth systems, methods, and apparatuses that verify accuracy of a model. There are many advantages of these and other embodiments described herein. For instance, by verifying accuracy of a synthetically-trained model using samples of authentic data, example systems may efficiently and effectively verify that the model outputs accurate predictions and otherwise exhibits normal behavior prior to putting the model into a production environment, thus avoid complex issues arising from an inaccurate model in production. Further, embodiments alleviate concerns about data misuse by utilizing authentic data explicitly granted permission to be used in model verification processes.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, a modeling system 102 may include a system device 104 in communication with a storage device 106. Although system device 104 and storage device 106 are described in singular form, some embodiments may utilize more than one system device 104 and/or more than one storage device 106. Additionally, some embodiments of the modeling system 102 may not require a storage device 106 at all. Whatever the implementation, the modeling system 102, and its constituent system device(s) 104 and/or storage device(s) 106 may receive and/or transmit information via communications network 108 (e.g., the Internet) with any number of other devices, such as one or more of data source 110A through data source 110N, and/or client device 112A through client device 112N.

System device 104 may be implemented as one or more servers, which may or may not be physically proximate to other components of modeling system 102. Furthermore, some components of system device 104 may be physically proximate to the other components of modeling system 102 while other components are not. System device 104 may receive, process, generate, and transmit data, signals, and electronic information to facilitate the operations of the modeling system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the modeling system 102. Storage device 106 may store information relied upon during operation of the modeling system 102, such as various geospatial data that may be used by the modeling system 102 and/or the like. In addition, storage device 106 may store control signals, device characteristics, and access credentials enabling interaction between the modeling system 102 and one or more of the data sources 110A-110N or client devices 112A-112N.

The one or more data sources 110A-110N may be embodied by servers or any computing devices known in the art, such as desktop or laptop computers, tablet devices, smartphones, or the like or may be embodied by any storage devices known in the art. Similarly, the one or more client devices 112A-112N may be embodied by any computing devices known in the art, such as desktop or laptop computers, tablet devices, smartphones, or the like. The one or more data sources 110A-110N and the one or more client devices 112A-112N need not themselves be independent devices, but may be peripheral devices communicatively coupled to other computing devices.

Although FIG. 1 illustrates an environment and implementation in which the modeling system 102 interacts with one or more of data sources 110A-110N and/or client devices 112A-112N, in some embodiments users may directly interact with the modeling system 102 (e.g., via input/output circuitry of system device 104). Whether by way of direct interaction or via a separate client device 112A-112N, a user may communicate with, operate, control, modify, or otherwise interact with the modeling system 102 to perform the various functions and achieve the various benefits described herein.

Example Implementing Apparatuses

Figure 2:
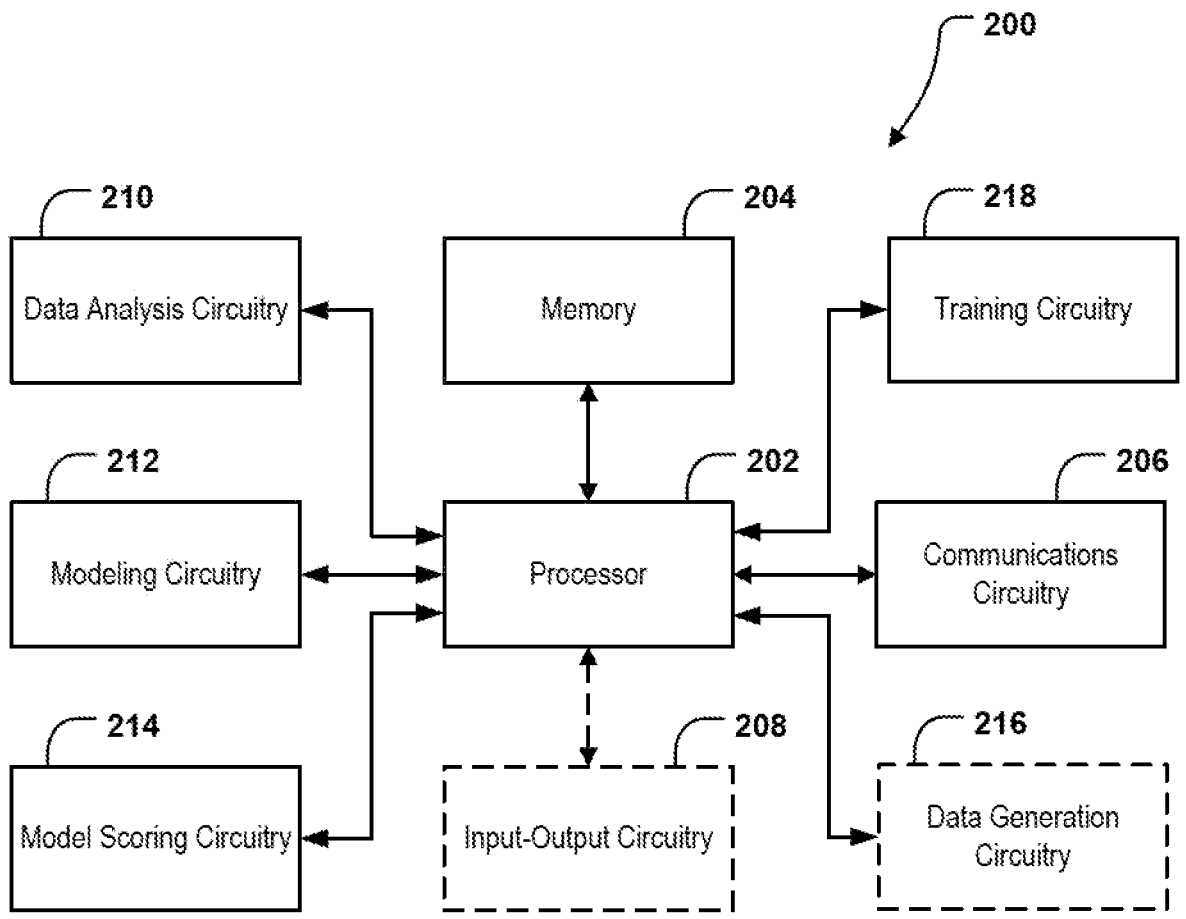
FIG. 2 illustrates a schematic block diagram of example circuitry embodying a device that may perform various operations in accordance with some example embodiments described herein.

System device 104 of the modeling system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, data analysis circuitry 210, modeling circuitry 212, model scoring circuitry 214, data generation circuitry 216, and training circuitry 218, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIGS. 3-5.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as one of client devices 112A-112N (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises data analysis circuitry 210 that selects authentic data points from an authentic dataset. The data analysis circuitry 210 may utilize processor 202, memory 204, or any other hardware component included in the apparatus 200 to perform these operations, as described in connection with FIGS. 3-5 below. The data analysis circuitry 210 may further utilize communications circuitry 206 to gather data from a variety of sources (e.g., data sources 110A-110N, client devices 112A-112N and/or storage device 106, as shown in FIG. 1), may utilize input-output circuitry 208 to receive data from a user, and in some embodiments may utilize processor 202 and/or memory 204 to select an authentic data point set from an authentic data set (e.g., based on a model verification permission level granted to data points in the authentic data point set, as further described herein in connection with FIG. 4).

In addition, the apparatus 200 further comprises modeling circuitry 212 that generates output data of a model having been trained using a synthetic dataset. For example, output data may comprise one or more predicted outputs based on corresponding inputs to a model. The modeling circuitry 212 may utilize processor 202, memory 204, or any other hardware component included in the apparatus 200 to perform these operations, as described in connection with FIGS. 3-5 below. In some embodiments, the modeling circuitry 212 may comprise a model (or multiple models), such as a machine learning (ML) model (e.g., supervised or unsupervised), artificial intelligence (AI) reasoning model, and/or the like which is utilized to generate output data (e.g., predicted outputs) based on corresponding input data provided to the model. In some embodiments, an example model of the modeling circuitry 212 may be trained using synthetic data. The example model may be trained exclusively using synthetic data, or, in other embodiments, the model may be partially trained using synthetic data (while also using authentic data as training data).

In addition, the apparatus 200 further comprises model scoring circuitry 214 that determines an accuracy score for a model based on output data. The model scoring circuitry 214 may utilize processor 202, memory 204, or any other hardware component included in the apparatus 200 to perform these operations, as described in connection with FIGS. 3-5 below. The model scoring circuitry 214 may further utilize communications circuitry 206 to gather data from a variety of sources (e.g., data sources 110A-110N, client devices 112A-112N and/or storage device 106, as shown in FIG. 1), may utilize input-output circuitry 208 to receive data from a user, and in some embodiments may utilize processor 202 and/or memory 204 to compare predicted outputs of output data to known outcomes of authentic data, and/or compare predicted outputs of output data of a first model to predicted outputs of output data of a second model and generate an accuracy score based on the comparison. As further described below in connection with FIG. 5, the model circuitry may also compare the output data having been generated using different samples of authentic data to generate a variance score of the model's output data to in turn determine whether retraining of the model is necessary.

In addition, the apparatus 200 may optionally comprise data generation circuitry 216 that generates a synthetic dataset. The data generation circuitry 216 may utilize processor 202, memory 204, or any other hardware component included in the apparatus 200 to perform these operations, as described in connection with FIG. 3 below. The data generation circuitry 216 may further utilize communications circuitry 206 to gather data from a variety of sources (e.g., data sources 110A-110N, client devices 112A-112N and/or storage device 106, as shown in FIG. 1), may utilize input-output circuitry 208 to receive data from a user, and in some embodiments may utilize processor 202 and/or memory 204 to generate a synthetic dataset.

In addition, the apparatus 200 further comprises training circuitry 218 that trains a model. In some embodiments, the training circuitry 218 may train a model using a synthetic dataset. The training circuitry 218 may utilize processor 202, memory 204, or any other hardware component included in the apparatus 200 to perform these operations, as described in connection with FIG. 3 below. The training circuitry 218 may further utilize communications circuitry 206 to gather data from a variety of sources (e.g., data sources 110A-110N, client devices 112A-112N and/or storage device 106, as shown in FIG. 1), may utilize input-output circuitry 208 to receive data from a user, and in some embodiments may utilize processor 202 and/or memory 204 to train a model.

Although components 202-218 are described in part using functional language, it will be understood that the particular implementations necessarily include the use of particular hardware. It should also be understood that certain of these components 202-218 may include similar or common hardware. For example, the data analysis circuitry 210, modeling circuitry 212, model scoring circuitry 214, data generation circuitry 216, and training circuitry 218 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the data analysis circuitry 210, modeling circuitry 212, model scoring circuitry 214, data generation circuitry 216, and training circuitry 218 may leverage processor 202, memory 204, communications circuitry 206, or input-output circuitry 208 as described above, it will be understood that any of these elements of apparatus 200 may include one or more dedicated processors, specially configured field programmable gate arrays (FPGA), neural engine(s), neural compute stick(s), tensor processing units (TPU), graphical processing unit (GPU), and/or application specific interface circuits (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the data analysis circuitry 210, modeling circuitry 212, model scoring circuitry 214, data generation circuitry 216, and training circuitry 218 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, apparatus 200 may access one or more third party circuitries via any sort of networked connection that facilitates transmission of data and electronic information between the apparatus 200 and the third party circuitries. In turn, apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Figure 3:
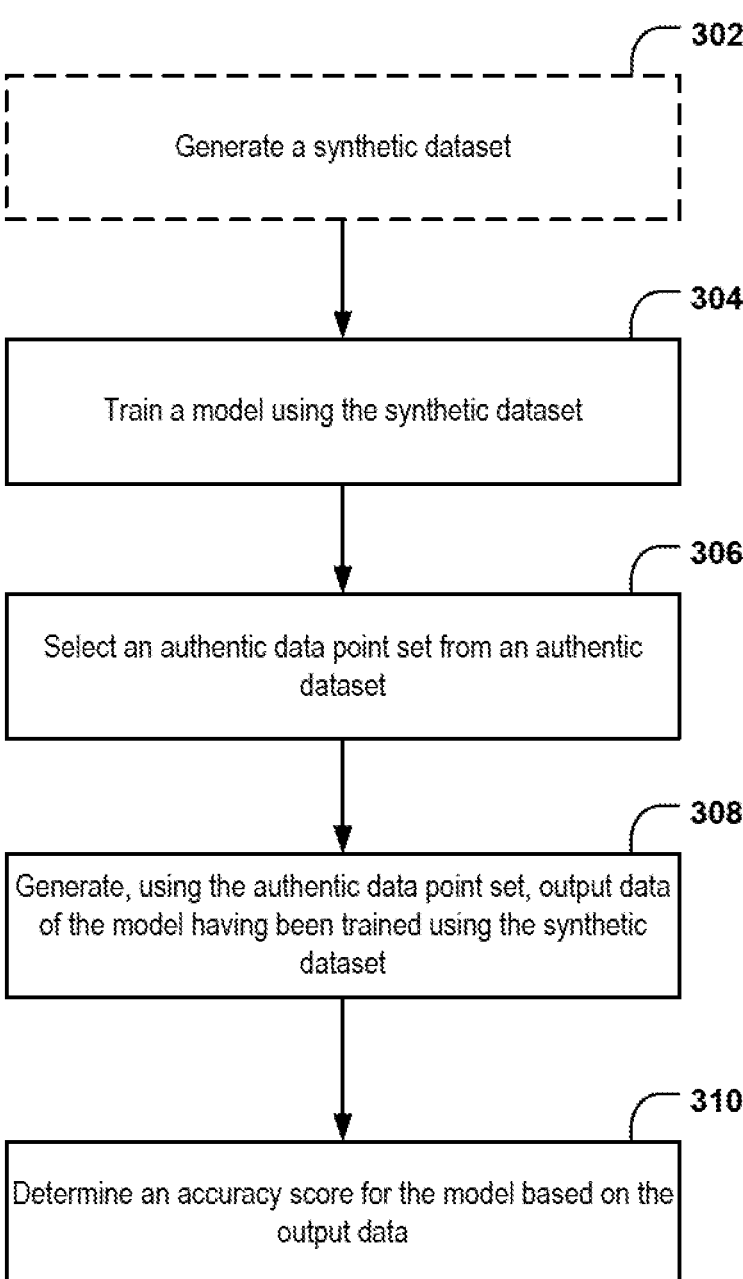
FIG. 3 illustrates an example flowchart for verifying accuracy of a model, in accordance with some example embodiments described herein.
Figure 4:
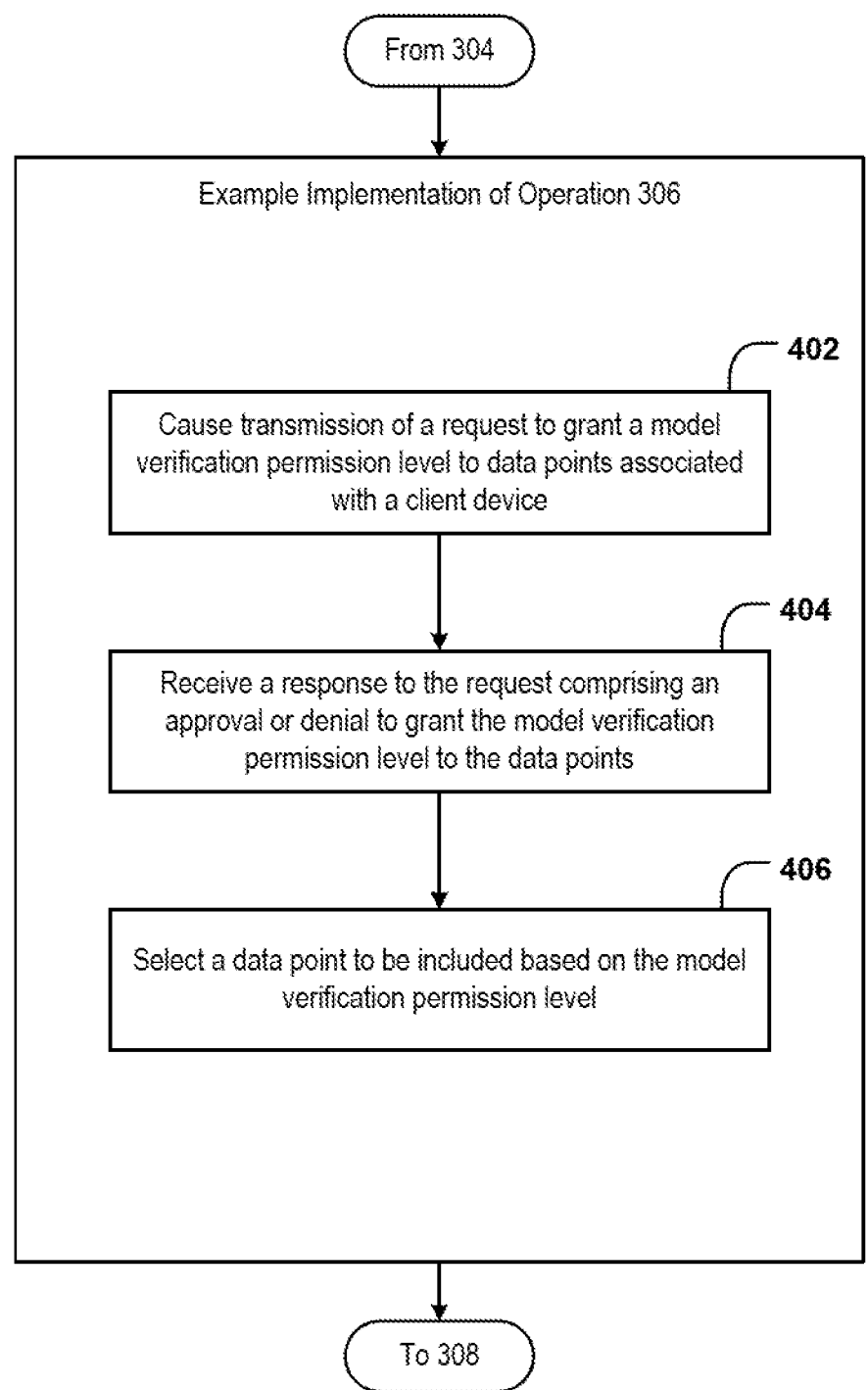
FIG. 4 illustrates an example flowchart for selecting an authentic data point set from an authentic dataset, in accordance with some example embodiments described herein.
Figure 5:
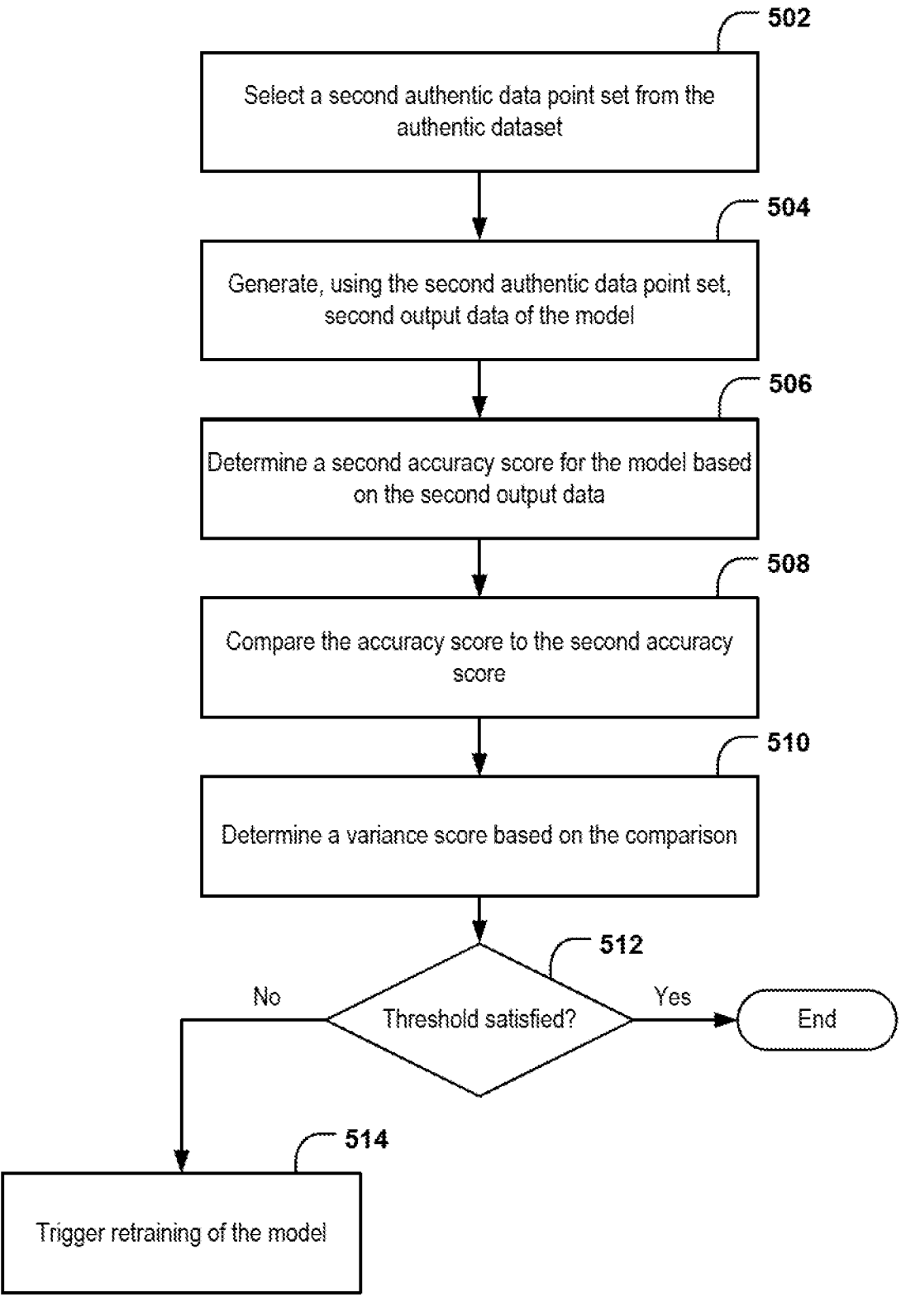
FIG. 5 illustrates an example flowchart for determining whether retraining of a model is needed based on a variance score, in accordance with some example embodiments described herein.

Turning to FIGS. 3-5, example flowcharts are illustrated that contain example operations implemented by example embodiments described herein. The operations illustrated in FIGS. 3-5 may, for example, be performed by system device 104 of the modeling system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, data analysis circuitry 210, modeling circuitry 212, model scoring circuitry 214, data generation circuitry 216, training circuitry 218, and/or any combination thereof. It will be understood that user interaction with the modeling system 102 may occur directly via input-output circuitry 208, or may instead be facilitated by separate client device(s) 112A-112N, as shown in FIG. 1, and which may have similar or equivalent physical componentry facilitating such user interaction.

Turning first to FIG. 3, example operations are shown for verifying accuracy of a model.

As shown by operation 302, the apparatus 200 may include means, such as processor 202, memory 204, data generation circuitry 216, and/or the like, for generating a synthetic dataset. The synthetic dataset may be generated for the purpose of training a model. In this regard, the synthetic dataset may be used as training data for a model.

The synthetic dataset may be generated in a variety of ways. For example, the synthetic dataset may be generated using one or more algorithms that include decision trees, deep learning techniques, and/or iterative proportional fitting. In some embodiments, the synthetic dataset may be generated based on an authentic dataset. For example, the modeling system 102 and/or an entity (e.g., an organization or the like) managing the modeling system 102 may continuously collect authentic data points from a variety of sources, such as client devices (e.g., client devices 112A-112N) of customers, various computing devices associated with the entity and/or third party devices (e.g., data sources 110A-110N) and/or the like, which may in turn be stored (e.g., in storage device 106) as an authentic dataset with which the modeling system 102 may then utilize to generate a synthetic dataset.

In some embodiments, authentic data points may be received from a plurality of data sources 110A-110N. Examples of these data sources 110A-110N may include third-party data service providers (e.g., companies that sell user data), satellite data agencies (e.g., satellite imagery provided in real-time or in batches), vehicles (e.g., navigation systems and/or other devices onboard vehicles), smart devices (e.g., Internet-connected devices of any kind that may collect data, such as smart appliances, Internet-of-Things (IoT) devices or the like), and/or the like, retail and/or other businesses, cellular towers, Internet Service Providers (ISPs) providing aggregated population data, etc.

In some embodiments, authentic data points may be received from a plurality of client devices 112A-112N.

Examples of these client devices 112A-112N may include devices such as mobile phones, laptops, tablets, smart watches, smart glasses, virtual reality (VR) headsets, Global Positioning System (GPS) devices such as navigation devices, and/or any other devices which may owned or carried by various users. In some embodiments, authentic data points may be received from client devices 112A-112N through a mobile application ("app") executing on the client devices. For example, the app may be associated with the modeling system. In some embodiments, as further described below, users may designate (e.g., via the mobile app) various permissions governing the collection of complete or anonymized data from various other apps on the device and/or as the user interacts with the particular device.

The authentic dataset may comprise authentic labeled data points (e.g., data points that have been tagged with one or more labels identifying certain properties, characteristics, classifications, and/or contained objects). In some embodiments, the authentic dataset may be pre-processed (e.g., cleaned) prior to generating synthetic data based on the authentic dataset.

Using an authentic dataset, a synthetic dataset may be generated by determining best-fit distributions for given authentic data points in the authentic dataset. In some embodiments, a machine learning model may be used to fit the distributions. For example, machine learning models such as decision trees may model non-classical distributions which may be multi-modal, which may not contain common characteristics of known distributions. Using a machine learning fitted distribution, a synthetic dataset may be generated that is highly correlated with original, authentic data. In some embodiments, deep generative models such as a Variational Autoencoder (VAE) and/or a Generative Adversarial Network (GAN) may be used to generate the synthetic dataset.

In some embodiments, rather than generating a synthetic dataset, the modeling system 102 may instead obtain a synthetic dataset from another source (e.g., a data source 110A-110N). In this regard, the modeling system 102 may receive a synthetic dataset from a third-party source or the like. In this regard, the apparatus 200 includes means, such as processor 202, memory 204, communications circuitry 206, or the like, for receiving a synthetic dataset. In some embodiments, the synthetic dataset may be received in response to a request for the synthetic dataset. In this regard, the apparatus 200 includes means, such as processor 202, memory 204, communications circuitry 206, or the like, for causing transmission of a request for a synthetic dataset.

Regardless of how the synthetic dataset is generated and/or obtained, the synthetic dataset may be used to train a model. As shown by operation 304, the apparatus 200 includes means, such as processor 202, memory 204, training circuitry 218, or the like, for training a model using the synthetic dataset. In some embodiments, the model may be trained exclusively using the synthetic dataset, in that only synthetic data (and not authentic data) is used as training data to train the model. In other embodiments, the model may be trained using a mix of synthetic data and authentic data.

Once trained, the model may be tested (e.g., to verify accuracy of the model) and subsequently be put into production and begin processing inputs to the model (e.g., authentic data points) to produce various output data in the form of predictions or the like. However, as mentioned above, model testing for synthetically-trained models often involves using synthetic data as test data. As mentioned above, this may lead to issues once the model is put into production. For instance, while a synthetically-trained model may appear to output accurate predictions during tests using synthetic data, the model may be revealed to be inaccurate when processing authentic data once in production (e.g., due to poor synthetic training data and/or synthetic testing data that does not accurately representing real-world data). To circumvent these issues, in some embodiments, authentic data points may be selected from an authentic dataset for use in testing a synthetically-trained model. By doing so, a clearer understanding of the model's accuracy and overall performance is gained prior to being put into production.

As shown by operation 306, the apparatus 200 includes means, such as processor 202, memory 204, data analysis circuitry 210, or the like, for selecting an authentic data point set from an authentic dataset. As mentioned above, an authentic dataset may comprise authentic data points collected by the modeling system 102 (and/or an entity managing the modeling system 102) from various sources, such as other devices managed by the entity, client devices such as mobile devices belonging to customers utilizing a mobile app or associated with the entity, etc. However, although a wide range of authentic data points may be collected, not all authentic data points may be appropriately used in various instances. For example, some customers may not allow an entity to sell or otherwise provide their data to other entities. Additionally, laws may be in place to prevent misuse of data and protect customer data. In this regard, the modeling system 102 may analyze the authentic dataset to identify data points which can be used as testing data for the model. For instance, the modeling system 102 may identify data points which have been granted permission for use as testing data. Turning briefly to FIG. 4, example operations for selecting authentic data points from an authentic dataset are shown.

In some embodiments, the modeling system 102 may request permission from various sources to use data points originating from those sources to verify accuracy of or otherwise validate models deployed by the modeling system 102. In this regard, as shown by operation 402, the apparatus 200 includes means, such as processor 202, memory 204, communications circuitry 206, or the like, for causing transmission of a request to grant a model verification permission level to data points associated with a client device. As one example, the request may be transmitted to a mobile device of a customer (although the request may be transmitted to mobile devices of any number of other types of entities or individuals who interact with the modeling system 102, such as vendors, employees, or the like). The request may be in the form of a notification through a mobile app (e.g., a mobile app associated with an entity managing the modeling system 102) stored on a client device 112A-112N. For example, in an instance in which the entity is a bank, the mobile app may be a mobile banking application. The request may explicitly inform the user of how their data will be used such that the user can make an informed decision on whether or not to grant the model verification permission level to their data.

As shown by operation 404, the apparatus 200 includes means, such as processor 202, memory 204, communications circuitry 206, or the like, for receiving a response to the request comprising an approval or denial to grant the model verification permission level to the data points. In some embodiments, if the model verification permission level is granted, data points that have been received from that device as well as data points that are continuously received from that device going forward may be used as test data to verify accuracy of a model prior to deployment of the model. In various embodiments, the response to the request may grant approval to all data points received from that device, to only some data points received from that device (e.g., those having certain particular characteristics, or those explicitly identified in the response), or to none of the data points received from that device. An indication of the authentic data points to which approval has been granted may be stored as metadata in the data structure holding the authentic dataset, or such an indication may be stored separately with reference to the various authentic data points in the authentic dataset, such that the separate storage location can be referenced to confirm the model verification permission level granted to any individual authentic data point in the authentic dataset. Furthermore, it will be appreciated that the model verification permission level may identify a gradation of approvals for the various authentic data points, such that individuals can allow certain authentic data points to be used for certain purposes (e.g., some authentic data points may in fact be usable for training a model, whereas others are usable for model testing only, still others are usable for training and/or testing only in certain scenarios, and some authentic data points may not be usable for any model development purposes at all).

As shown by operation 406, the apparatus 200 includes means, such as processor 202, memory 204, data analysis circuitry 210, or the like, for selecting an authentic data point set from an authentic dataset based on the model verification permission level granted to the various authentic data points within the authentic dataset. If a suitable model verification permission level is not granted, the data points (which may still be collected for other purposes based on other granted permission levels) may not be selected as data points to be used in an authentic dataset for model testing.

In some embodiments, while the authentic dataset may include numerous data points having been granted the model verification permission level, only a portion of the data points having been granted the model verification permission level may be selected for testing. For example, a predefined amount (e.g., 5%) of the data points may be selected to be used for model testing. Advantageously, when only a fraction of the authentic dataset is leveraged to ensure adequate accuracy of the model itself, there is a corresponding reduction to the risk of unwanted exposure of the remaining authentic data to malicious actors or other parties.

Returning to FIG. 3, as shown by operation 308, the apparatus includes means, such as processor 202, memory 204, modeling circuitry 212, or the like, for generating, using the authentic data point set, output data of the model having been trained using the synthetic dataset. In this regard, the authentic data point set comprising authentic data points (having been granted the model verification permission level) selected from the authentic dataset may be provided to the synthetically-trained model as input. The model may process the authentic data point set and generate output data in the form of predicted outputs based on corresponding inputs.

In some embodiments, generating the output data (as well as selecting the authentic data point set) may be performed in a high security environment in order to minimize exposure of the authentic dataset and data points selected from the authentic dataset. In this regard, the apparatus includes means, such as processor 202, memory 204, communications circuitry 206, or the like, for causing transmission of indicia of the model to a high security environment. For example, the synthetically-trained model may be transmitted or otherwise transported to a high security environment (e.g., an environment in which the authentic dataset is stored) prior to executing over the authentic data point set. The high security environment may include one or more computing devices which can temporarily store the model. The high security environment may include a physical zone only accessible to select trusted personnel. The high security environment may include various data protection mechanisms, such as firewalls and/or the like which protect and encapsulate the authentic dataset within the high security environment. In some embodiments, the modeling system 102 itself may reside in the high security environment. In this regard, the apparatus includes means, such as processor 202, memory 204, modeling circuitry 212, or the like, for generating, using the authentic data point set, the output data within the high security environment to mitigate exposure of the authentic data point set.

As shown by operation 310, the apparatus includes means, such as processor 202, memory 204, model scoring circuitry 214, or the like, for determining an accuracy score for the model based on the output data. In some embodiments, the accuracy score may comprise a value (e.g., a value between 0 and 1) that represents how accurate the model is in making predictions.

The modeling system 102 may determine the accuracy score in various ways. For instance, in some embodiments, the accuracy score may be determined based on a comparison of the output data of the model (as generated as described above in connection with operation 308) to known outcomes of the authentic data point set (i.e., ground truth as defined by labels associated with the authentic data point set). In this regard, the apparatus includes means, such as processor 202, memory 204, model scoring circuitry 214, or the like, for comparing predicted outputs of the output data to known outcomes associated with the authentic data point set.

In some embodiments, comparing predicted outputs of the output data to known outcomes associated with the authentic data point set may involve determining distances between predicted outputs and their known outcomes. As one example, a statistical distance such as a Jaccard distance may be determined to gauge how dissimilar a predicted output and its known outcome are. Other statistical approaches may be used in ultimately determining the accuracy score, such as Euclidean distances, other statistical distances, and/or the like.

In some embodiments, comparing predicted outputs of the output data to known outcomes associated with the authentic data point set may involve the use of a second trained model. The second trained model may be trained using portions of the authentic dataset (e.g., collected data points that have been permitted to be used for various means such as modeling), such as the authentic data point set referenced previously. In some embodiments, the second model may be trained in parallel to the synthetically-trained model described above. In some embodiments, training of the second model may be performed in a high security environment (as described above) in order to minimize exposure of the authentic dataset. To determine the accuracy score of the synthetically-trained model, output data of the second model may be compared with output data of the synthetically-trained model. In this regard, a statistical distribution of data points in the output data generated by the synthetically-trained model may be compared with a corresponding statistical distribution gathered from output data of the second model that has been trained using portions of the authentic data point set. Generating the output data of the second model may also be performed in the high security environment. In this regard, the apparatus 200 includes means, such as processor 202, memory 204, modeling circuitry 212, or the like, for generating, using the authentic data point set, second output data of a second model having been trained using the authentic dataset. The outputs of the models may then be compared to determine an accuracy score. In this regard, the apparatus 200 includes means, such as processor 202, memory 204, model scoring circuitry 214, or the like, for comparing, by the model scoring circuitry, predicted outputs of the output data to predicted outputs of the second output data. As described above, distance values (e.g., Jaccard distance, Euclidean distance, etc.) for statistical distributions of the two sets of output data may be calculated and used to determine the accuracy score of the synthetically-trained model.

In some embodiments, in addition to determining an accuracy score, a variance score may also be determined in order to gain a better understanding of the accuracy of the model as well as determine whether retraining of the model is needed. Turning to FIG. 5, example operations are shown for determining whether retraining of a model is needed based on a variance score.

As shown by operation 502, the apparatus 200 includes means, such as processor 202, memory 204, data analysis circuitry 210, or the like, for selecting a second authentic data point set from the authentic dataset. Authentic data points may be selected from the authentic dataset to be included in the second authentic data point set in a similar manner as described above in connection with operation 306 of FIG. 3. For instance, a portion of the data points having been granted the model verification permission level may be selected from the authentic dataset to be included in the second authentic data point set. The portion of data points selected for the second authentic data point set may be different from the portion of data points selected for the authentic data point set used to generate the output data as described above.

As shown by operation 504, the apparatus 200 includes means, such as processor 202, memory 204, modeling circuitry 212, or the like, for generating, using the second authentic data point set, second output data of the model. In this regard, the second authentic data point set comprising authentic data points (having been granted the model verification permission level) selected from the authentic dataset may be provided to the synthetically-trained model as input. The model may process the second authentic data point set and generate second output data in the form of predicted outputs based on corresponding inputs.

As shown by operation 506, the apparatus 200 includes means, such as processor 202, memory 204, model scoring circuitry 214, or the like, for determining a second accuracy score for the model based on the second output data. The second accuracy score may be determined in a similar manner to the accuracy score determined for the output data (as described above in connection with operation 310 of FIG. 3).

As shown by operation 508, the apparatus 200 includes means, such as processor 202, memory 204, model scoring circuitry 214, or the like, for comparing the accuracy score to the second accuracy score. The accuracy score may be compared with the second accuracy score in order to determine a variance between the accuracy scores. In this regard, as shown by operation 510, the apparatus 200 includes means, such as processor 202, memory 204, model scoring circuitry 214, or the like, for determining a variance score based on the comparison. In some embodiments, the variance score may be a difference between the accuracy score and the second accuracy score. For instance, an example accuracy score of 0.9 (e.g., 90% accuracy) and an example second accuracy score of 0.40 (e.g., 40% accuracy) may result in a variance score of 0.5. In some embodiments, higher accuracy scores combined with low variance scores indicates the model is performing as intended. For example, as the model produces output data for multiple batches of authentic data point sets pulled from the authentic dataset, accuracy scores ranging from 0.89 to 0.92 and variance scores therefore ranging from 0.0 to 0.03 may indicate a positive trend and that the model is ready to be put into production to process authentic data as needed. However, accuracy scores ranging from 0.40 to 0.65 and variance scores therefore ranging up to 0.25 may indicate that the synthetic dataset used to train the model may not have been fully representative of all potential outcomes exhibited in authentic data points. In other words, the model may not be adequately trained and retraining may be needed. In this regard, a threshold defining a particular accuracy score and/or a separate threshold defining a particular required variance score for a predefined number of tests to the model may be used to determine whether retraining is needed. For example, thresholds may require, for a predefined number of model tests using different portions of the authentic dataset as input to the model, an average accuracy score of 0.85 and a variance score not exceeding 0.05.

In some embodiments, the variance score may be determined based on multiple dimensions in that one or more measures may be determined and combined to arrive at the variance score. In this regard, rather than compute the variance score on a single measure (e.g., an Area Under Curve (AUC) score), multiple measures may be taken into consideration. For example, a variance score may be determined based on a set of measures including AUC, precision, recall, and/or other similar measures.

As shown by decision point 512, if all relevant thresholds are satisfied, the method may the end. For instance, the model may exhibit strong accuracy scores and low variance scores such that the model may be deployed into production. However, if a threshold is not satisfied, retraining of the model may be triggered. In this regard, as shown by operation 514, the apparatus 200 includes means, such as processor 202, memory 204, modeling circuitry 212, or the like, for triggering retraining of the model based on a deficient variance score (while not shown, retraining may similarly be triggered based on a deficient accuracy score, and/or a combination of deficiencies in variance and accuracy). In some embodiments, triggering retraining may involve generating a new synthetic dataset and continuing to train the model using the new synthetic dataset. In some embodiments, the modeling system 102 may alert personnel responsible for maintaining the model and/or modeling system that retraining of the model is required. In this regard, the apparatus 200 includes means, such as processor 202, memory 204, communications circuitry 206, input-output circuitry 208, or the like, for causing presentation of a notification to retrain the model. For example, the modeling system 102 may cause transmission of the notification to various devices (e.g., client devices) associated with the personnel, may cause display of the notification via input-output circuitry 208, and/or the like.

As described above, example embodiments provide methods and apparatuses that improve performance and validation of models trained using synthetic data. By utilizing authentic data to verify accuracy of a synthetically-trained such models prior to deployment, example embodiments thus mitigate negative and otherwise complex issues that may arise from use of poorly performing models in production. Through utilization of the above-described technical operations to enhance the accuracy of models trained using synthetic data, such models become practical tools for new modeling scenarios for which they are currently unsuitable. Further, despite using authentic data for evaluating models, example embodiments provide an additional level of data protection for such authentic data by importing models into a high security environment in which the authentic data is stored, thus avoiding potential exposure of authentic data to any malicious actors while still enabling productive benefit to be gained from the authentic data. Accordingly, example embodiments thus provide another technical improvement in that they enhance the performance of a computing platform implementing the model while still mitigating the risk of exposure of sensitive authentic data. Furthermore, by leveraging authentic data points having been explicitly granted a model verification permission level, example embodiments avoid data privacy issues that may otherwise arise from the use of authentic data. As these examples all illustrate, example embodiments contemplated herein provide technical solutions that solve real-world technical problems faced during traditional implementations of model deployment.

FIGS. 3-5 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for verifying accuracy of models trained using synthetic data, the method comprising:
   selecting, by data analysis circuitry, a first authentic data point set from an authentic dataset based on a model verification permission level granted to data points in the authentic dataset;
   generating, by modeling circuitry and using the first authentic data point set, first output data of a first model having been trained using a synthetic dataset;
   determining, by model scoring circuitry, a first accuracy score for the first model based on the first output data;
   selecting, by the data analysis circuitry, a second authentic data point set from the authentic dataset;
   generating, by the modeling circuitry and using the second authentic data point set, second output data of the first model;
   determining, by the model scoring circuitry, a second accuracy score for the first model based on the second output data;
   comparing, by the model scoring circuitry, the first accuracy score to the second accuracy score;
   determining, by the model scoring circuitry, a variance score based on the comparison; and
   triggering, by the modeling circuitry, retraining of the first model based on the variance score.

2. The method of claim 1, further comprising:
   causing transmission, by communications circuitry, of a request to grant the model verification permission level to a data point of the first authentic data point set; and
   receiving, by the communications circuitry, a response to the request, wherein the response comprises an approval or denial to grant the model verification permission level to the data point.

3. The method of claim 1, further comprising:
   generating, by data generation circuitry, the synthetic dataset; and training, by training circuitry, the first model using the synthetic dataset prior to generating the first output data.

4. The method of claim 1, wherein generating the first output data using the first authentic data point set comprises:
   causing transmission, by communications circuitry, of indicia of the first model to a high security environment; and
   generating, by the modeling circuitry and using the first authentic data point set, the first output data within the high security environment to mitigate exposure of the first authentic data point set.

5. The method of claim 1, wherein determining the first accuracy score for the first model based on the first output data comprises:
   comparing, by the model scoring circuitry, predicted outputs of the first output data to known outcomes associated with the first authentic data point set,
   wherein the first accuracy score is determined based on the comparison.

6. The method of claim 1, wherein determining the first accuracy score for the first model based on the first output data comprises:
   generating, by the modeling circuitry, third output data of a second model having been trained using the authentic dataset; and
   comparing, by the model scoring circuitry, predicted outputs of the first output data to predicted outputs of the third output data,
   wherein the first accuracy score is determined based on the comparison.

7. An apparatus for verifying accuracy of models trained using synthetic data, the apparatus comprising:
   data analysis circuitry configured to select a first authentic data point set from an authentic dataset based on a model verification permission level granted to data points in the authentic dataset;
   modeling circuitry configured to generate, using the first authentic data point set, first output data of a first model having been trained using a synthetic dataset; and
   model scoring circuitry configured to determine a first accuracy score for the first model based on the first output data;
   wherein the data analysis circuitry is further configured to select a second authentic data point set from the authentic dataset;
   wherein the modeling circuitry is further configured to generate, using the second authentic data point set, second output data of the model; and
   wherein the model scoring circuitry is further configured to:
      determine a second accuracy score for the first model based on the second output data,
      compare the first accuracy score to the second accuracy score, and
      determine a variance score based on the comparison; and
   wherein the modeling circuitry is further configured to trigger retraining of the first model based on the variance score.

8. The apparatus of claim 7, further comprising communications circuitry configured to:
   cause transmission of a request to grant the model verification permission level to a data point of the first authentic data point set; and receive a response to the request, wherein the response comprises an approval or denial to grant the model verification permission level to the data point.

9. The apparatus of claim 7, further comprising:

data generation circuitry configured to generate the synthetic dataset; and training circuitry configured to train the first model using the synthetic dataset prior to generating the first output data.

10. The apparatus of claim 7, further comprising communications circuitry configured to cause transmission of indicia of the first model to a high security environment, wherein the modeling circuitry generates the first output data using the first authentic data point set within the high security environment to mitigate exposure of the first authentic data point set.

11. The apparatus of claim 7, wherein the model scoring circuitry determines the first accuracy score for the first model based on the first output data by comparing predicted outputs of the first output data to known outcomes associated with the first authentic data point set, wherein the first accuracy score is determined based on the comparison.

12. The apparatus of claim 7, wherein the model scoring circuitry determines the first accuracy score for the first model based on the first output data by:

generating third output data of a second model having been trained using the authentic dataset; and comparing predicted outputs of the first output data to predicted outputs of the third output data, wherein first the accuracy score is determined based on the comparison.

13. A computer program product for verifying accuracy of models trained using synthetic data, the computer program product comprising at least one non-transitory computer-readable storage medium storing software instructions that, when executed, cause an apparatus to:

select a first authentic data point set from an authentic dataset based on a model verification permission level granted to data points in the first authentic dataset;

generate, using the first authentic data point set, first output data of a first model having been trained using a synthetic dataset;

determine an accuracy a first accuracy score for the first model based on the first output data;

select a second authentic data point set from the authentic dataset;

generate, using the second authentic data point set, second output data of the first model;

determine a second accuracy score for the first model based on the second output data;

compare the first accuracy score to the second accuracy score;

determine a variance score based on the comparison; and trigger retraining of the first model based on the variance score.

14. The computer program product of claim 13, wherein the software instructions, when executed, are further configured to cause the apparatus to:

cause transmission of a request to grant the model verification permission level to a data point of the first authentic data point set; and receive a response to the request, wherein the response comprises an approval or denial to grant the model verification permission level to the data point.

15. The computer program product of claim 13, wherein the software instructions, when executed, are further configured to cause the apparatus to:

cause transmission of indicia of the first model to a high security environment, wherein generating the first output data using the first authentic data point set is performed within the high security environment to mitigate exposure of the first authentic data point set.

\* \* \* \* \*